April 14, 1964 R. E. JACKE 3,128,934
RECLOSABLE CARTONS AND BLANKS THEREFOR
Filed Sept. 29, 1960 5 Sheets-Sheet 1

INVENTOR
RAYMOND E. JACKE
BY Glenn & Jackson
HIS ATTORNEYS

April 14, 1964 R. E. JACKE 3,128,934
RECLOSABLE CARTONS AND BLANKS THEREFOR
Filed Sept. 29, 1960 5 Sheets-Sheet 2

INVENTOR
RAYMOND E. JACKE

BY Glenn & Jackson

HIS ATTORNEYS

INVENTOR
RAYMOND E. JACKE

INVENTOR
RAYMOND E. JACKE

HIS ATTORNEYS

United States Patent Office 3,128,934
Patented Apr. 14, 1964

3,128,934
RECLOSABLE CARTONS AND BLANKS
THEREFOR
Raymond E. Jacke, Henrico County, Va., assignor to
Reynolds Metals Company, Richmond, Va., a corporation of Delaware
Filed Sept. 29, 1960, Ser. No. 59,304
2 Claims. (Cl. 229—14)

This invention relates to improved reclosable carton constructions and to improved blanks for forming such cartons or the like.

Many cartons have heretofore been provided with closure means that permit initial opening of the carton by breaking the sealing means thereof and thereafter permit reclosing of the carton by interlocking the closure means in their closed positions.

However, many of these prior known cartons have tear-away sections that must be disposed of upon initial opening of the carton as well as have slots in the closure means thereof which must be kept open during the packaging and sealing of the carton to permit tuck-in tabs to be inserted therein when the cartons are reclosed. Further, to prevent tampering with the closure means of these prior known structures, the same must either be provided with an overwrap that increases the cost of the cartons or with sealing means that requires substantial mutilation of the closure means when the cartons are initially opened. Also, because of the configurations of the reclosable means of these prior known cartons, not only is the appearance of the cartons objectionable but the same require additional blank material and difficult sealing operations whereby high speed manufacturing thereof is prevented and the resulting costs of the same are prohibitive.

According to the teachings of this invention, however, reclosable cartons are provided which are attractive in design, easily initially opened without carton mutilation and quickly and tightly reclosed while being substantially tamper-proof before the same are initially opened without requiring an additional overwrap, free from disposable parts and objectionable slots, adaptable to high speed manufacturing operations, and are formed from one-piece blanks that utilize a minimum of material.

Generally, the cartons of this invention are each provided with a plurality of closure flaps that initially seal closed an open end of the carton by having at least one of the closure flaps provided with a tear-away section that is secured to another closure flap so that the tear-away section breaks away from its respective closure flap when the same is pulled away from the carton to initially open the open end thereof. The tear-away section is so constructed and arranged that the same defines a portion on the remaining section of the closure flap that is adapted to be inserted under edge defining means of another closure flap to tightly reclose the open end of the carton and detachably lock the closure flaps in their closed positions until it is desired to reopen the carton. Since the tear-away section is secured to one of the closure flaps, the tear-away section is carried therewith when the carton is initially opened whereby no objectionable disposable pieces are provided.

Accordingly, it is an object of this invention to provide an improved reclosable carton having each and/or every novel feature set forth above or hereinafter shown and/or described.

Another object of this invention is to provide an improved carton blank for forming such cartons or the like.

Other objects, uses and advantages of this invention are apparent from a reading of this description which proceeds with reference to the accompanying drawings forming a part thereof and wherein.

Figure 1:
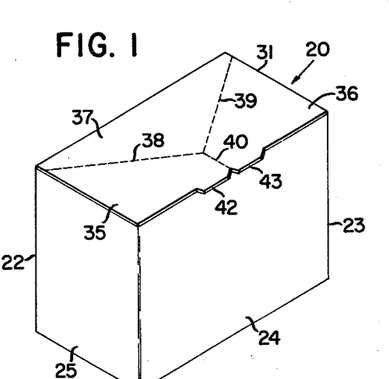
FIGURE 1 is a perspective view of an improved carton of this invention.

Reference is now made to FIGURE 1, illustrating an improved reclosable carton of this invention which is generally indicated by the reference numeral 20. The carton 20 may be formed from any suitable material, such as cardboard or the like, and may be provided with any suitable overwrap (not shown) or may be devoid of an overwrap if desired. The carton 20 is provided with improved closure means that permit the carton 20 to be sealed in the closed position to provide a glued tamperproof structure that can be readily opened without mutilating the carton 20 to gain access to the contents thereof and thereafter permit the carton 20 to be reclosed in a simple and effective manner by detachably locking the closure means in place.

Figure 11:
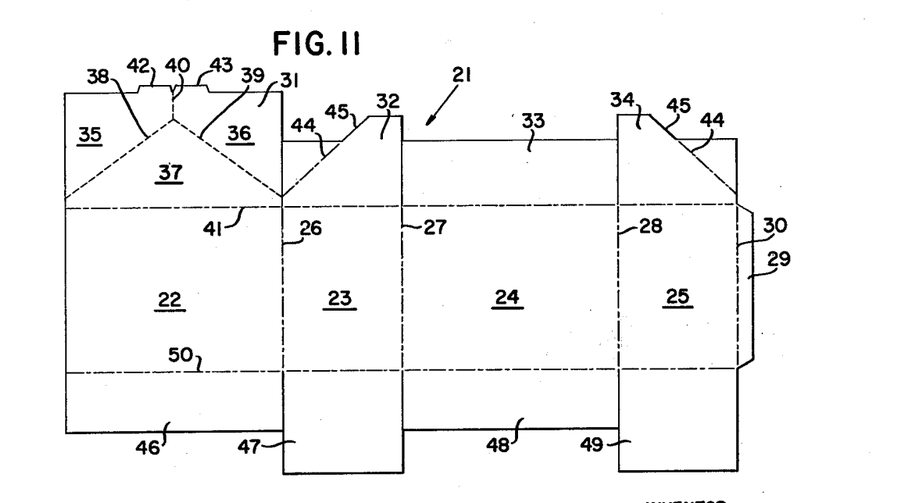
FIGURE 11 is a plan view of an improved carton blank of this invention that is utilized to form the carton illustrated in FIGURE 1.

The carton 20 is formed from an improved carton blank of this invention, which is illustrated in FIGURE 11 and is generally indicated by the reference numeral 21.

The substantially rectangular blank 21 is suitably cut and scored to define a series of foldably connected side panels 22, 23, 24, and 25, the panels 22 and 23 being interconnected together at a score or fold line 26, the panels 23 and 24 being interconnected together at a score or fold line 27, and the panels 24 and 25 being interconnected together at a score or fold line 28.

An interlocking tab or flap 29 is foldably connected to the side panel 25 at the score or fold line 30 and it is adapted to be secured to the inside surface of the side panel 22 when the side panels 22—25 are subsequently arranged in a box-like configuration to provide the four sidewall means of the carton 20. A plurality of closure flaps 31, 32, 33 and 34 are respectively foldably connected to the outer edges of the side panels 22, 23, 24, and 25. The closure flap 31 is dividable into three sections 35, 36, and 37, as the same is perforated along lines 38, 39, and 40, whereby the section 37 is hingedly secured to the side panel 22 at a longitudinally disposed score or fold line 41 and detachably secured to the sections 35 and 36 at the respective perforated lines 38 and 39. The sections 35 and 36 are detachably secured to each other at the perforated line 40 and respectively have projecting grasping tabs 42 and 43 extending from the outer edges thereof.

The closure flaps 32 and 34 are respectively provided with score or fold lines 44, the score lines 44 being substantially extensions of angularly disposed edges 45 thereof for a purpose hereinafter to be described.

The remaining closure flap 33 is substantially rectangular and has a width that is slightly less than half the width of the closure flap 31. However, the width of the closure flap 31 may be of any desired dimension, depending upon the function thereof.

Figure 10:
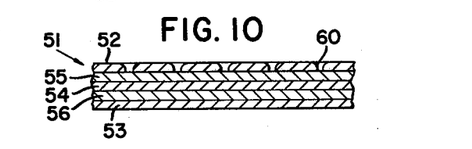
FIGURE 10 is a view similar to FIGURE 9 and illustrates the laminated structure of the liner in the region of the closing seam of the liner.

A plurality of closure flaps 46, 47, 48, and 49 are respectively foldably connected to the other ends of the side panels 22, 23, 24, and 25 at the fold or score line 50 to provide conventional closure means for the other end of the container 20. It is to be understood that the closure flaps 46—49 may have any other desired configuration from that illustrated in FIGURE 10, as the same do not form a necessary part of this invention.

After the side panels 22—25 of the blank 21 have been arranged in a box-like configuration and have been secured together by the interlocking flap 29 in the manner well known in the art, the closure flaps 46—49 are secured together to close the bottom of the carton 20. A suitable liner 51 is disposed in the carton 20 and may be formed of the type disclosed in my copending application, Serial No. 638,016, filed February 4, 1957, now Patent No. 2,998,178 and entitled, "Lined Container for Liquids and Liner Therefor," and secured to the carton 20 in the manner set forth in my copending application, Serial No. 17,222, filed March 23, 1960, now Patent No. 3,095,134, granted June 25, 1963, and entitled "Lined Container for Liquids and Liner Therefor With Method for Rapidly Assembling the Same." While the liner 51 forms the subject matter of the copending applications, it is deemed necessary to explain the construction thereof in view of the significance of the liner 51 in combination with the carton 20.

Figure 9:
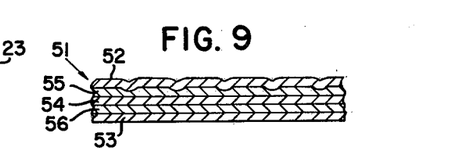
FIGURE 9 is an enlarged, fragmentary cross-sectional view illustrating the laminated structure of the liner utilized with the carton of FIGURE 1.

In particular, the liner 51 as illustrated in FIGURE 9 comprises a laminated structure having a thin layer 52 of metallic foil, preferably aluminum, on the inner surface thereof and a somewhat thicker layer 53 of porous material, such as tissue paper and the like, on the other side thereof. A centrally located layer 54 of material impervious to heated wax and comprising, for example, flexible paper or plastic film, is suitably disposed between the layers 52 and 53, with layers 55 and 56 of a heat-sealing composition therebetween, such as microcrystalline wax or the like. Accordingly, when heat is applied to the liner 51 by any suitable means, the wax layers tend to flow, but, due to the presence of the wax-impervious layer 54, the direction of flow or migration is controlled and takes place in an outward direction whereby the wax migrates through the tissue layer 53 to adhere to the inner surfaces of the container 20.

Figure 8:
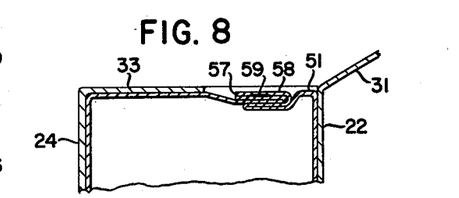
FIGURE 8 is a fragmentary, axial cross-sectional view taken on line 8—8 of the carton structure illustrated in FIGURE 7 and illustrates the position of the liner closing seam.

The liner 51 is formed into a box-like configuration in any suitable manner to be received in the carton 20 and has an end 57, FIGURE 8, which forms a closing seam 58 to seal the liner 51 in its closed position. In order to secure the adjacent surfaces of the aluminum foil 52 at the end 57 together to substantially hermetically seal the liner 51 in its closed position, the foil 52 in the region of the reference numeral 59, FIGURE 8, is perforated to permit wax from the layer 55 to pass through such perforations 60, FIGURE 10, in the foil layer 52 to seal the adjacent aluminum layers 52 together in the region of the closing seam 58.

Figure 6:
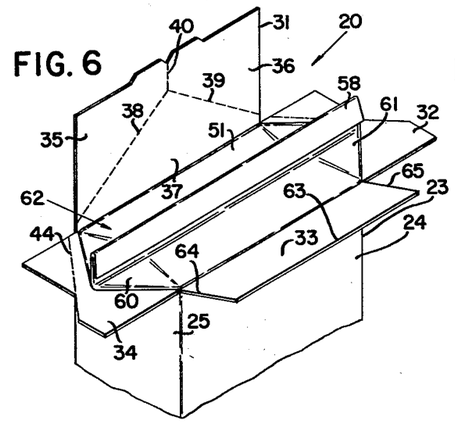
FIGURE 6 is a fragmentary, perspective view illustrating one of the steps in the method of initially sealing the carton illustrated in FIGURE 1.

After the liner 51 has been disposed in the carton 20, secured thereto, filled with the desired product, and sealed at the seam 58 thereof, the closing seam 58 of the liner 51 is folded down into the carton 20 to the position illustrated in FIGURES 6 and 8, whereby respective end portions 60 and 61 thereof extend beyond the side panels 25 and 23. Subsequently, the closure flap 33 is bent at substantially a right angle relative to its associated side panel 24 to extend over the open end 62 of the carton 20 in the manner illustrated in FIGURE 7. The free edge or edge defining means 63 of the closure flap 33 is disposed closely adjacent the folded closing seam 58 of the liner 51 whereby the closing seam 58 of the liner 51 is adapted to be pushed down into the carton 20 without interfering with the closure flaps 31—34. Thereafter, the closure flaps 34 and 32 are folded over the open end 62 of the carton 20 to the position illustrated in FIGURE 7, whereby the respective end portions 60 and 61 of the liner 51 are folded between the closure flaps 34, 32 and the closure flap 33, the folding of the portions 60 and 61 of the liner 51 being guided by the side edges 64 and 65 of the closure flap 33.

Figure 7:
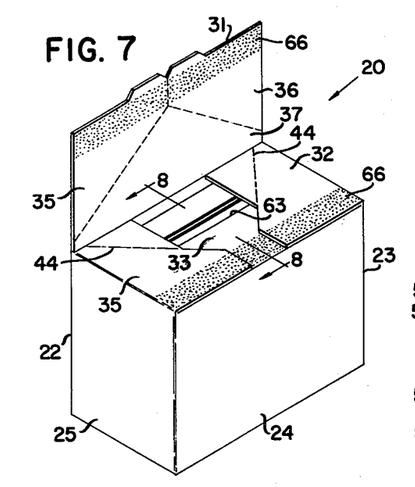
FIGURE 7 is a perspective view and illustrates another step in the method of initially sealing the carton of FIGURE 1.

Suitable adhesive 66, FIGURE 7, is applied to either the inside surface of the closure flap 31 or to the outside exposed surfaces of the closure flaps 32, 33, and 34, or to both as desired. Since the gluing 66 can be accomplished in a continuous straight line operation, it can be seen that the cartons 20 can be glued in a high speed operation.

It should be noted that the gluing 66 does not extend inwardly a sufficient distance to cover the section 37 of the closure flap 31 when the closure flap 31 is subsequently closed downwardly over the other closure flaps 32—34 in the manner illustrated in FIGURE 1 to secure the closure flaps 31—34 in the closed position, whereby the section 37 of the closure flap 31 is not adhesively secured to the other closure flaps 32—34. However, the tearaway sections 35 and 36 of the closure flap 31 are respectively secured to the closure flaps 34 and 32 by the gluing 66.

Thus, in the above manner, the carton 20 has been closed by the closure flaps 31—34 whereby the closed carton 20 can be shipped, stored, and subsequently displayed for sale without requiring an overwrap, as the closure flaps 31—34 provide an effective tamper-proof sealing of the carton 20. Further, because the closing seam 58 of the liner 51 can be pushed down into the carton 20 by the flaps 31, 32, and 34, the closure flaps 31—34 are disposed in a flat condition without interference from the bulky liner closing seam 58 whereby an attractive and undistorted closure means is provided for the carton 20.

Figure 2:
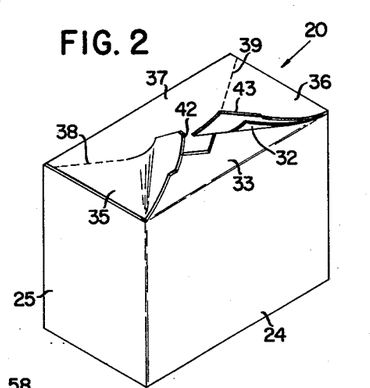
FIGURE 2 is a perspective view of the carton illustrated in FIGURE 1 and illustrates one of the steps in the method of initially opening the same.

When it is desired to initially open the carton 20, the grasping means 42 and 43 of the respective tear-away portions 35 and 36 of the outer closure flap 31 are peeled upwardly and outwardly in the manner illustrated in FIGURE 2 whereby the tear-away sections 35 and 36 separate from each other along the perforated line 40 and subsequently separate from the remaining section 37 of the closure flap 31 along the respective perforated lines 38 and 39 to open the carton 20.

In order to further facilitate such separation between the sections 35—37, the carton blank 21 can be die cut at the juncture of the perforated lines 38—40 to provide slits of the order of ⅛ inch long interconnecting with each other at the juncture of the sections 35—37 and extending along the respective separation lines 38—40. In this manner, any tendency for the separation operation of the sections 35—37 to foul at the juncture thereof will be eliminated by such pre-formed die cuts or slits. Also, the separation lines 38, 39 and 40 may be further weakened by providing such die cuts along the same at selected intervals.

As the tear-away sections 35 and 36 are initially peeled outwardly, the inner corner portions of the same separate from the exposed portion of the closure flap 33 by breaking the seal therebetween. However, as the same are further peeled outwardly, the closure flaps 34 and 32 are carried therewith by the adhesive 66 and pull out from underneath the remaining section 37 of the closure flap 31 as the same are adapted to bend along the diagonal score lines 44 thereof.

Figures 3, 4:
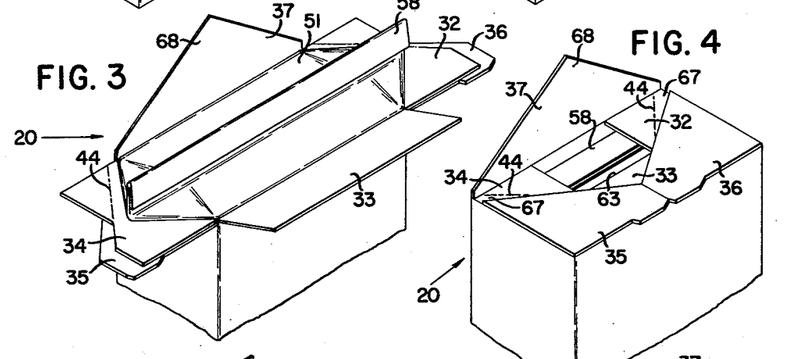
FIGURE 3 is a fragmentary, perspective view of the carton and illustrates the final step in opening the carton of FIGURE 1.
FIGURE 4 is a fragmentary, perspective view of the carton of FIGURE 1 and illustrates one of the initial steps in the method of reclosing the carton.

After the tear-away sections 35 and 36 have been completely separated from the section 37 of the closure flap 31, the flaps 34 and 32 can be disposed in the position illustrated in FIGURE 3, with the section 37 and the closure flap 33 opened outwardly to provide access to the liner so that the liner 51 can be opened by unfolding the closing seam 58 thereof to dispense the contents of the container 20.

Thus, it can be seen that the sealed carton can be initially opened without mutilating the closure means thereof and without disposable parts.

When it is desired to reclose the carton 20 after the same has been initially opened in the manner set forth above, the liner 51 is refolded to the position illustrated in FIGURE 3 and the closure flap 33 is folded over the open end 62 of the carton 20. Thereafter, the closure flaps 34 and 32, with their interconnected tear-away portions 35 and 36, are folded inwardly over the closure flap in the manner illustrated in FIGURE 4. As illustrated in FIGURE 4, sufficient unbent portions 67 of the closure flaps 34 and 32 project beyond the respective tear-away section 35 and 36 so that when the section 37 of the closure flap 31 is brought thereover the same is superimposed on the unbent portions 67 of the closure flaps 32 and 34 to hold the closure flaps 34 and 32 in their closed position.

Figure 5:
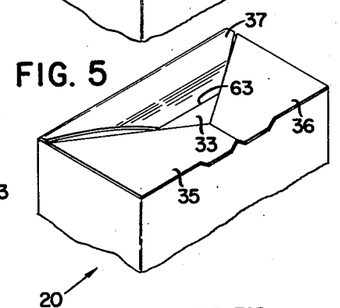
FIGURE 5 is a fragmentary, perspective view of the carton illustrated in FIGURE 1 and illustrates the same in its reclosed position.

When the tear-away portions 35 and 36 have been removed from the section 37 of the closure flap 31, the same define a pointed end portion 68 thereof which is adapted to be inserted under the free edge or edge defining means 63 of the closure flap 33 in the manner illustrated in FIGURE 5 whereby the section 37 interlocks the closure flaps 31—34 in their closed positions. Thus, the carton 20, as illustrated in FIGURE 5, is quickly and temporarily locked in its closed position until it is desired to reopen the same by merely pulling the tuck-in portion 68 of the section 37 from beneath the closure flap 33 to permit folding outwardly of the closure flaps 34, 32, and 33 to reopen the carton 20.

Therefore, it can be seen that there has been provided an improved carton structure 20 which can be initially sealed closed by the closure means thereof to form a tamper-proof closed container which can be easily opened and thereafter effectively and tightly reclosed until it is desired to reopen the same. Further, it can be seen that such carton structure 20 lends itself to high speed manufacturing operations and utilizes a minimum of material because the closure flaps 31—34 do not extend across the entire open end 62 of the carton 20.

While the carton 20 has been described in combination with the liner 51, it is to be understood that other types of liners may be utilized therewith or that the carton 20 may function in the above manner without a liner as desired.

When the carton 20 is initially opened, the portions of the tear-away sections 35 and 36 disposed between the free ends of the respective closure flaps 34 and 32 and the separation line 40 must be separated from the exposed surface of the closure flap 33 because the gluing 66 has secured the same thereto. If such surface area on the closure flap 33 is too great, it may be difficult to effect easy separation of the sections 35 and 36 from the adhesive 66 whereby carton multilation would result.

Therefore, in order to prevent a large surface area on the closure flap 33 to which the inner portions of the tear-away sections 35 and 36 will be glued, the closure flaps 34 and 32 can be so constructed and arranged that the same expose only the desired amount of surface area of the closure flap 33 to which the tear-away sections 35 and 36 will be glued when the carton is initially closed, as is illustrated in FIGURE 7. In this manner, only a sufficient portion of the tear-away sections 35 and 36 are glued to the closure flap 33 whereby the gluing 66 does not adversely affect the ease of initially opening the carton 20.

However, when the carton 20 is relatively long and narrow, it would require an excess amount of carton blank material to provide closure flaps 34 and 32 which would have the free ends thereof extend across the open end of the carton 20 a sufficient distance to provide only a small exposed surface area of the closure flap 32 to which the inner portions of the tear-away sections 35 and 36 will be glued. Further, even if the carton 20 is not long and narrow, it would be desirable to save carton blank material by reducing the length of the closure flaps 32 and 34, except that such reduced length would result in too large of an exposed surface area of the closure flap 33 for proper gluing.

Accordingly, the carton blank 21 and carton 20 can be formed in the manner illustrated in FIGURES 20-25 disclosing another carton 110 of this invention.

Figure 20:
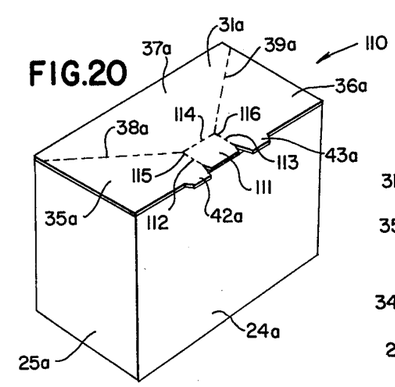
FIGURE 20 is a perspective view of another carton of this invention.
Figure 21:
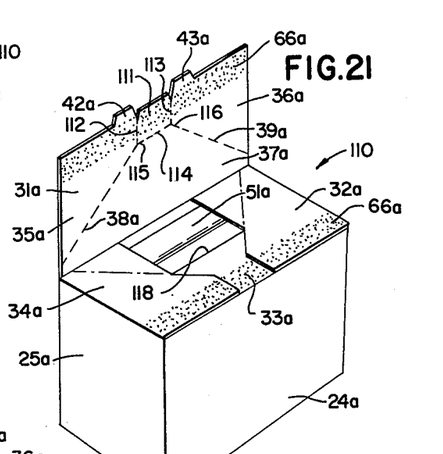
FIGURE 21 is a fragmentary, perspective view of the carton of FIGURE 20 and illustrates the method of initially closing the carton.

The carton 110 is substantially identical to the carton 20, except for the construction of the outer closure flap 31a thereof, and, therefore, like parts are indicated by like reference numerals followed by the letter a.

The closure flap 31a has been suitably cut and scored to define four dividable sections 35a, 36a 37a, and 111, the sections 35a and 36a respectively being interconnected to the section 37a by perforated separation lines 38a and 39a and to the section 111 by perforated lines 112 and 113. The section 111 is interconnected to the section 37a by a perforated line 114, the line 14 terminating at each end thereof at the respective junctures 115 and 116 of the pairs of perforated lines 38a, 112 and 39a, 113. In order to facilitate separation of the sections 35a, 36a, 37a, and 111 from each other, suitable die cuts or slits can be provided at the junctures 115 and 116 and extend along the respective separation lines for a desired distance, such as ⅛ of an inch.

The section 111 of the closure flap 31a is so constructed and arranged that the same is disposed between the free ends of the closure flaps 32a and 34a when the closure flap 31a is closed and may have any desired length as long as the same does not overlap part of the flaps 32a and 34a. In the embodiment illustrated in the drawings, the length of the section 111 is substantially the same as the distance between the closure flap 32a and 34 when the carton 110 is closed, whereby the separation lines 112 and 113 are respectively superimposed on the free edges of the flaps 34a and 32a. In this manner, the tear-away sections 35a and 36a of the closure flaps do not have any portion thereof secured to the exposed surface of the closure flap 33a by the gluing 66a as is provided in the carton 20, because the section 111 covers the entire exposed surface of the closure flap 33a disposed between the free ends of the closure flaps 34a and 32a in the region of the gluing 66a, FIGURE 21.

Thus, since the same amount of blank material must be provided for the closure flap 31 of the carton 20 as is provided for the closure flap 31a of the carton 110 when the cartons 20 and 110 are of the same size, less carton blank material is required in forming the closure flaps 34a and 32a of the carton 110 than for the carton 20, as the distance between the closed flaps 34a and 32a can be greater than in the carton 20.

When the carton 110 is initially closed and sealed by the gluing 66, the sections 35a and 36a of the closure flap 31a are respectively secured to the closure flaps 34a and 32a and the section 111 is secured to the flap 33, whereby the carton 110 is completely closed.

Figure 22:
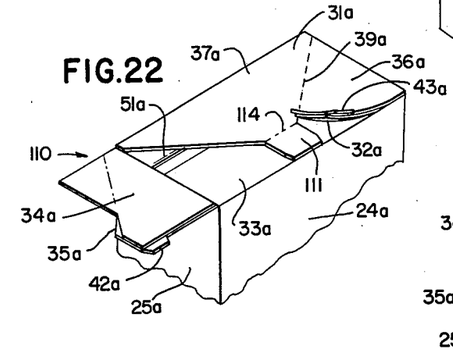
FIGURE 22 is a fragmentary, perspective view of the carton of FIGURE 20 and illustrates the method of initially opening the carton.

When it is desired to initially open the carton 110, the projecting grasping tabs 42a and 43a of the sections 35a and 36a are grasped and peeled upwardly and outwardly in the manner illustrated in FIGURE 22, to cause the sections 35a and 36a to separate from the section 111 along the respective lines 112 and 113. Subsequently, the sections 35a and 36a are separated from the section 37a along the respective separation lines 38a and 39a, the sections 35a and 36a carrying the closure flaps 34a and 32a therewith in the manner previously described for the carton 20.

Figure 23:
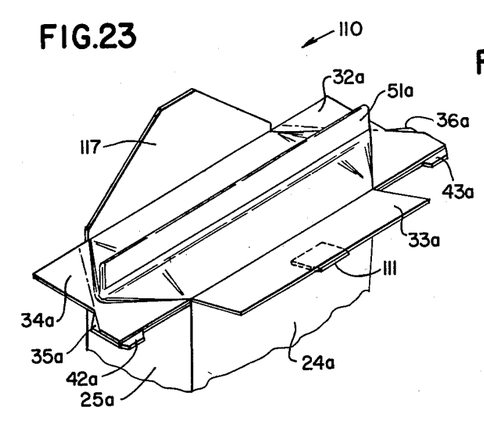
FIGURE 23 is a view similar to FIGURE 22 and illustrates the carton of FIGURE 20 in its opened position.

If the section 37a of the closure flap 31a has not separated from the section 111 along the line 114 during the removal of the closure flaps 34a and 32a from underneath the section 37a while the sections 35a and 36a are being peeled upwardly and outwardly, the same can be readily separated from the section 111 by inserting a finger under the section 37a and pulling upwardly to fully open the carton 110 as illustrated in FIGURE 23.

However, in order to facilitate separation of the section 37a from the section 111 when the sections 35a and 36a are initially peeled upwardly and outwardly, the separation line 114 can be weakened by a combination of perforations and die cuts or slits, whereby a relatively weak bond is originally formed between the sections 37a and 111. Thus, as the ends of the closure flaps 34a and 32a disposed under the section 37a are being pulled upwardly by the opening operation, the same exert an upward force on the section 37a which is sufficient to cause the section 37a to separate from the section 111 along the weakened separation line 114.

Also, since the separation line 114 is disposed over the closure flap 33a when the carton is initially closed, the section 37a can be originally separated from the section 111 by a slit or die cut extending along the entire length of the line 114. Thus, the carton 110 would be completely opened when the sections 35a and 36a are separated along the respective pairs of lines 112, 38a and 113, 39a.

Figure 24:
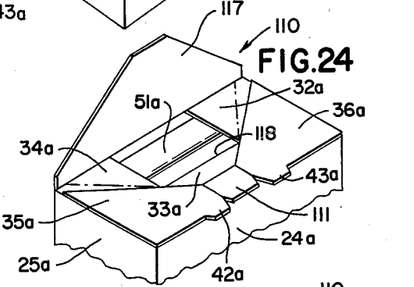
FIGURE 24 is a fragmentary, perspective view of the carton of FIGURE 20 and illustrates one of the steps in the method of reclosing the carton.
Figure 25:
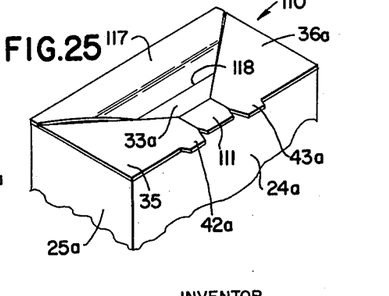
FIGURE 25 is a view similar to FIGURE 24 and illustrates the carton of FIGURE 20 in its reclosed position.

After the carton 110 has been opened in the above manner, it can be seen that the tear-away sections 35a and 36a cooperate with the section 111 to define a substantially trapezoidal end 117 on the section 37a, which can be inserted under the exposed edge 118, FIGURE 24, of the closure flap 33a, as illustrated in FIGURE 25, to completely reclose the carton 110 in substantially the same manner as the carton 20 previously described.

Thus, it can be seen that by providing the additional tear-away section 111 in the closure flap 31a, the carton 110 can be initially opened without requiring any separation of glued surfaces, as is provided in the carton 20. However, the length of the section 111 could be so constructed that any desired amount of the sections 35a and 36a would be glued to the closure flap 33a if desired.

Figures 12, 13, 14, 15, 16:
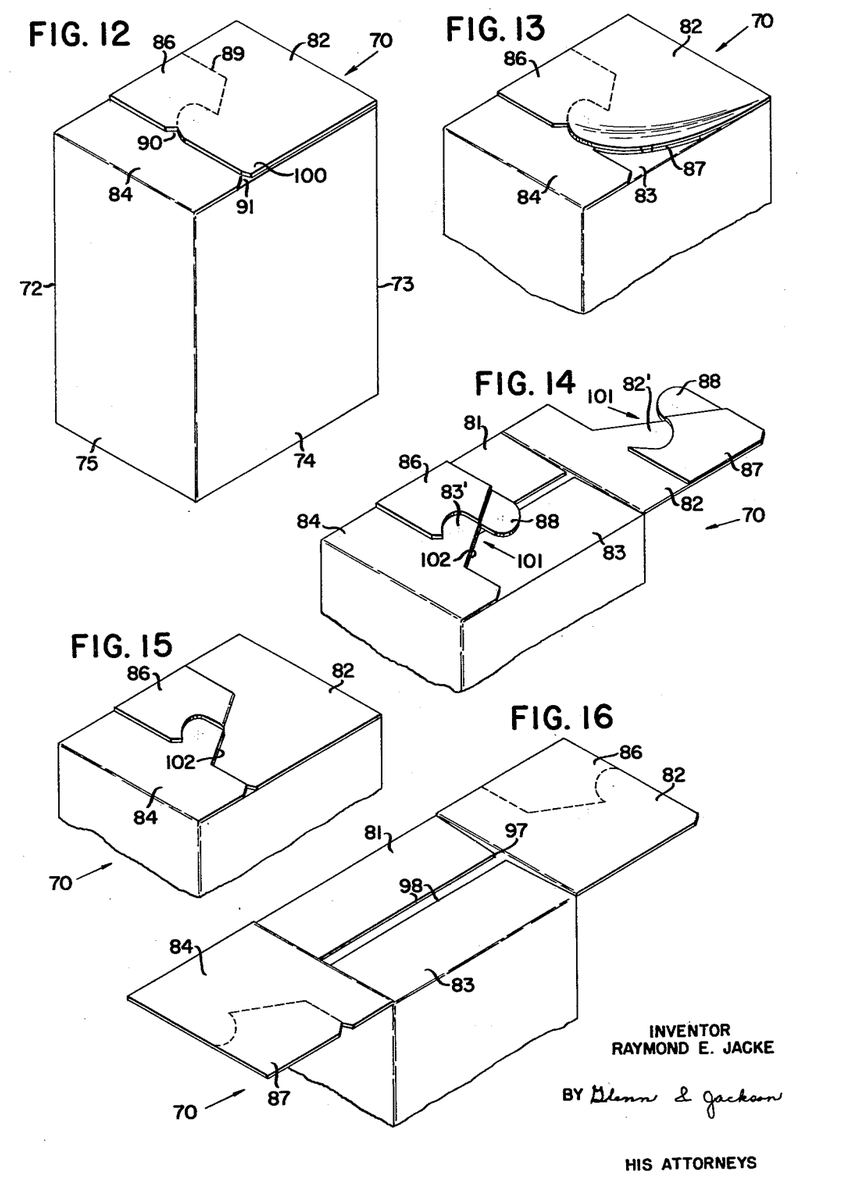
FIGURE 12 is a perspective view of another carton of this invention.
FIGURE 13 is a fragmentary, perspective view of the carton of FIGURE 12 and illustrates one of the steps in the method of initially opening the carton.
FIGURE 14 is a fragmentary, perspective view of the carton illustrated in FIGURE 12 and illustrates the final step in the method of initially opening the same.
FIGURE 15 is a view similar to FIGURE 14 and illustrates the manner of reclosing the carton illustrated in FIGURE 12.
FIGURE 16 is a fragmentary, perspective view illustrating one of the steps in the method of the initial sealing of the carton of FIGURE 12.
Figure 18:
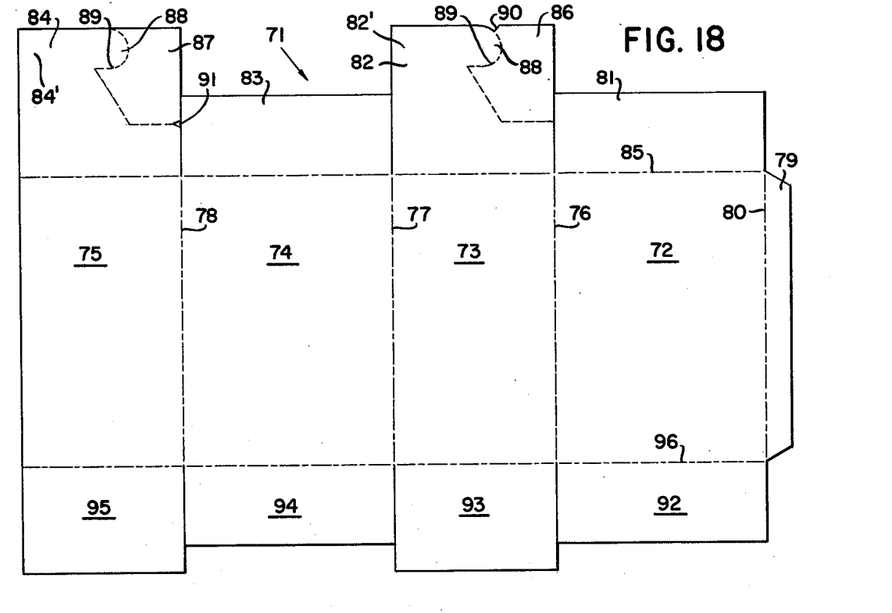
FIGURE 18 is a plan view illustrating an improved carton blank of this invention that is utilized to form the carton illustrated in FIGURE 12.

Referring now to FIGURE 12, another carton construction of this invention is generally indicated by the reference numeral 70 and is formed from a carton blank 71 of this invention illustrated in FIGURE 18 The carton 70, in a manner similar to the carton 20, has closure means that are adapted to initially seal the carton 70 in the closed position in such a manner that the same can be readily opened without carton mutilation and can thereafter be quickly and effectively locked in the closed position to tightly reclose the carton 70.

The carton blank 71 may be formed of any suitable material, such as cardboard or the like, and is suitably cut and scored to define a series of foldably connected side panels 72, 73, 74, and 75, the side panels 72 and 73 being interconnected together at the score or fold line 76, the panels 73 and 74 being foldably connected together at the score or fold line 77 and the panels 74 and 75 being foldably connected together at the score or fold line 78.

A suitable interlocking tab or flap 79 is foldably connected to the side panel 72 at the score or fold line 80 and functions to interconnect the side panels 72 and 75 to permit the side panels 72—75 to form the four sidewall means of the carton 70 in a manner well known in the art.

A plurality of closure flaps 81, 82, 83, and 84 are respectively foldably connected to the outer edges of the side panels 72, 73, 74, and 75 at the longitudinally disposed fold or score line 85. The closure flaps 81 and 83 are substantially rectangular and each have a width substantially the same as or slightly smaller than the width of the side panels 73 and 75 for purposes hereinafter described.

The closure flaps 82 and 84 respectively have tear-away sections 86 and 87, the tear-away sections 86 and 87 being identical in size and configuration and being adapted to define a tongue or interlocking portion 88 on the remaining sections 82' and 84' of the closure flaps 82 and 84 after the sections 86 and 87 have been broken away therefrom. The tear-away sections 86 and 87 are dividable from the closure flaps 82 and 84 along perforated and die cut lines 89, the lines 89 being die cut in the region of the more critical bends thereof.

The closure flap 82 is cut away at 90 to provide means for readily separating the tear-away section 86 from the remaining section 82' of the closure flap 82 in a manner hereinafter described. Similarly, the closure flap 84 is cut away at 91 to provide means for facilitating separation of the tear-away section 87 from the remaining section 84' of the closure flap 84 in a manner hereinafter described.

A plurality of closure flaps 92, 93, 94, and 95 are respectively foldably connected to the other ends of the side panels 72, 73, 74, and 75 at the longitudinally disposed score or fold line 96. While the closure flaps 92—95 are illustrated as being conventional closure flaps,, it is to be understood that the closure flaps 92—95 may have any desired configuration, as the same do not form an essential part of this invention.

After the side panels 72—74 have been arranged in a box-like configuration with the panels 72 and 75 interconnected together by the interlocking flap 79 in a manner well known in the art, the closure flaps 92—95 are secured together in a conventional manner to close the bottom of the carton 70 whereby the same can be filled with the desired product through the open end 97 thereof. Thereafter, the closure flaps 81—84 are adapted to seal close the open end 97 in the following manner:

As illustrated in FIGURE 16, the closure flaps 81 and 83 are disposed over the open end 97 of the carton 70, the free ends 98 of the closure flaps 81 and 83 abutting each other or being slightly spaced from each other as desired.

Figures 17, 19:
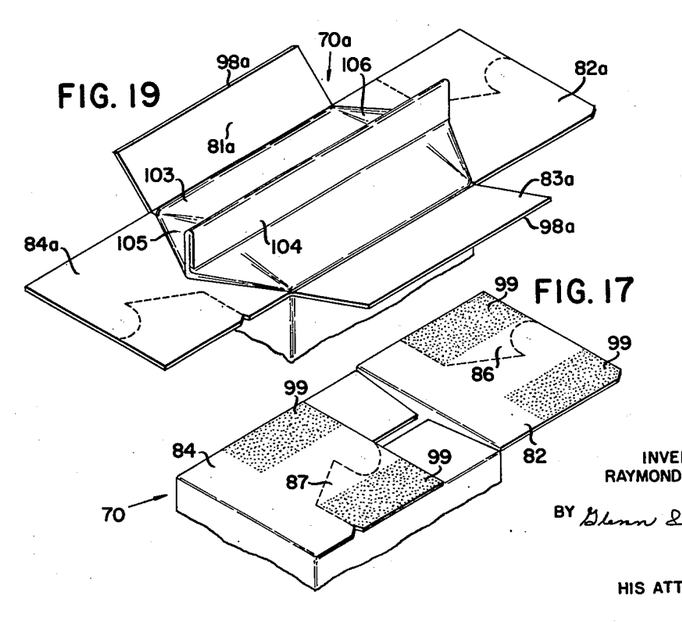
FIGURE 17 is a view similar to FIGURE 14 and illustrates another step in the method of initially sealing the carton of FIGURE 12.
FIGURE 19 is a view similar to FIGURE 16 and illustrates another embodiment of this invention.

Thereafter, the closure flap 84 is brought over the closure flaps 81 and 83 in the manner illustrated in FIGURE 17. The closure flaps 82 and 84 are so constructed and arranged that the same have end portions that overlap each other a distance equal to the width of the tear-away sections 86 and 87 in the manner illustrated in FIGURE 12.

Sufficient gluing or adhesive 99 is placed either on the outside surface of the closure flap 84 or the inside surface of the closure flap 82, or both, as desired, in a manner well known in the art. The gluing 99 is placed on one or both of the closure flaps 82 and 84 in such a manner that when the closure flap 82 is brought over the closure flap 84 in the manner illustrated in FIGURE 12, the tear-away section 87 of the closure flap 84 is adhesively secured to the nontear-away section 82' of the closure flap 82 and the tear-away section 86 of the closure flap 82 is adhesively secured to the nontear-away section 84' of the closure flap 84 for purposes hereinafter described.

After the closure flaps 82 and 84 have been adhesively secured together in the manner illustrated in FIGURE 12, the carton 70 is sealed closed, whereby the same is adapted to be shipped, stored and displayed without requiring an overwrap, as the closure flaps 81—84 provide an effective and tamper-proof seal for the carton 70.

Since the tear-away sections 86 and 87 of the closure flaps 82 and 84 are not superimposed on each other when the flaps 82 and 84 are secured in their overlapping positions, there is no tendency for the course flaps 82 and 84 to become separated from each other, whereby the carton 70 is effectively sealed in its closed position. However, by merely pulling the closure flap 82 upwardly, it can be seen that the tear-away sections 87 and 86 can be readily separated from the flaps 84 and 82, because the pull force is exerted from the sidewall 74 to the sidewall 72 along the major portions of the perforated lines 89, whereby little tear resistance is offered in opposition thereto.

When it is desired to initially open the carton 70, the closure flap 82 is grasped in the region of the reference numeral 100, FIGURE 12, and pulled outwardly and upwardly, whereby the tear-away section 87 begins to separate from the closure flap 84, FIGURE 13, along the separation line 89 thereof, as the tear-away section 87 is adhesively secured to the nontear-away section 82' of the closure flap 82. The cutaway portion 91 of the closure flap 84 facilitates the initial separation of the tear-away section 87 from the closure flap 84. After the tear-away section 87 has been separated from the closure flap 84 by pulling upwardly on the closure flap 82, the closure flap 82 begins to tear away from the tear-away section 86 thereof along the line 89, as the tear-away section 86 is adhesively secured to the nontear-away section 84' of the closure flap 84. The cutaway portion 90 of the closure flap 82 facilitates the initial separation of the tear-away portion 86 from the closure flap 82. Thereafter, further upward movement of the closure flap 82 causes the same to completely separate from the tear-away section 86, whereby the carton is opened in the manner illustrated in FIGURE 14.

In order to facilitate such initial opening operation of the carton 70, the separation lines 89 of the closure flaps 82 and 84 may be originally formed by a combination of perforations and die cuts or slits or formed with just die cuts or slits in the portions thereof which are disposed in directions other than the general tear direction between the opposed sidewalls 74 and 72 of the carton 70, whereas those portions of the separation lines 89 extending in the general tear direction may be formed by conventional perforations. Therefore, since those portions of the separation lines 89 tending to resist an initial opening operation of the carton 70 are substantially weakened by the additional slits or die cuts provided therein, there is no tendency for the flaps 82 and 84 to foul during the initial opening of the carton 70.

It can be seen that when the carton 70 is opened, the remaining sections 82' and 84' of the closure flaps 82 and 84 respectively have tongues 88 and grooves 101 formed therein.

When it is desired to reclose the carton 70, the closure flaps 81 and 83 are disposed over the open end 97 thereof and the closure flap 84 is disposed in the position illustrated in FIGURE 14. Thereafter, the closure flap 82 is brought over the open end 97 of the carton 70 and the tongue 88 thereof is inserted in the slot 101 of the closure flap 84 and underneath the edge defining means 102 of the closure flap 84 to interlock the closure flaps 82 and 84 in the position illustrated in FIGURE 15, the tongues 88 on the remaining sections 82' and 84' interlocking together to securely hold the flaps 81—84 in their closed positions. Thus, the carton 70 has the closure flaps 81—84 thereof quickly and tightly locked in the closed position until it is desired to reopen the same by merely removing the tongue 88 of the closure flap 82 from under the closure flap 84 and opening outwardly the closure flaps 82 and 84 to reopen the carton 70.

Since conventional closure flaps for cartons are overlapped at the end positions thereof to provide means for gluing the same in the closed position, it can be seen that the closure flaps 82 and 84 of the carton 70 do not utilize any more blank material than conventional closure flaps, while providing the added feature of being adapted to lock the closure flaps in the closed position to reclose the carton, a feature not provided by conventional closure flaps.

While the carton 70 has been described above as being utilized without a liner, it is to be understood that a liner may be utilized in combination therewith. For example, as illustrated in FIGURE 19, a liner 103 is disposed in the carton 70 and can be of the type set forth in the above-mentioned copending applications if desired. The liner 103 has a closing seam 104 projecting through the spacing between the free ends 98a of the closure flaps 81a and 83a, whereby the projecting end portions 105 and 106 of the liner 103 can be folded over the closure flaps 81a and 83a when the closure flaps 84a and 82a are folded over the end of the carton 70a. The closure flaps 84a and 82a of the carton 70a function in the same manner as the flaps 84 and 82 of the carton 70 previously described to initially seal and reclose the carton 70a.

Therefore, it can be seen that there has been provided another improved carton having means for providing a sealed tamper-proof closing that can be readily opened to initially open the carton and thereafter be reclosed in a simple and effective manner.

While the forms or embodiments of the invention now preferred have been disclosed, as required by statute, other embodiments or forms may be used, all coming within the scope of the claims which follow.

What is claimed is:

1. A carton comprising a plurality of foldably connected side panels providing sidewall means for said carton and defining an open end thereof, a liner disposed in said carton and having an end thereof extending beyond said open end of said carton and terminating in a closing seam, a first closure flap foldably connected to one of said side panels and extending across a portion of said open end, said first closure flap having a pair of opposed side edges and having a free edge disposed closely adjacent said closing seam of said liner, a pair of closure flaps respectively foldably connected to a pair of opposed side panels and being respectively superimposed on portions of said first closure flap, said pair of closure flaps respectively folding portions of said end of said liner between said pair of closure flaps and said first closure flap, said portions of said liner being folded at said side edges of said first closure flap, and an outer closure flap foldably connected to another side panel and being superimposed over said other closure flaps to close said open end of said carton, said outer closure flap being dividable into a plurality of sections, two of said sections being tearaway sections that are respectively secured to said pair of closure flaps to carry said pair of closure flaps therewith when said outer closure flap is divided into said sections to initially open said end of said carton, said tearaway sections defining at least part of an end edge of a substantially triangular portion on a remaining section of said outer closure flap that is insertable under edge defining means of said first closure flap to reclose said open end of said carton.

2. A carton as set forth in claim 1 wherein said closing seam of said carton is forced down into said carton by said pair of closure flaps and said outer closure flap when said carton is closed.

References Cited in the file of this patent

UNITED STATES PATENTS

| | | |
|---|---|---|
| 2,114,623 | Bergstein | Apr. 19, 1938 |
| 2,151,202 | Guyer | Mar. 21, 1939 |
| 2,162,556 | Lagaard | June 13, 1939 |
| 2,335,913 | Buttery | Dec. 7, 1943 |
| 2,789,751 | Feldman | Apr. 23, 1957 |

FOREIGN PATENTS

| | | |
|---|---|---|
| 750,832 | France | June 6, 1937 |